(12) United States Patent
Kolvenbach et al.

(10) Patent No.: US 12,806,576 B2
(45) Date of Patent: Nov. 24, 2026

US012806576B2

(54) MULTIVARIATE BRACKETING APPROACH FOR STERILE FILTER VALIDATION

(71) Applicant: AMGEN INC., Thousand Oaks, CA (US)

(72) Inventors: Carl G. Kolvenbach, Thousand Oaks, CA (US); Fuat Doymaz, Thousand Oaks, CA (US); Wenchang Ji, Thousand Oaks, CA (US)

(73) Assignee: AMGEN INC., Thousand Oaks, CA (US)

(*) Notice: Subject to any disclaimer, the term of this patent is extended or adjusted under 35 U.S.C. 154(b) by 1050 days.

(21) Appl. No.: 17/797,066

(22) PCT Filed: Feb. 1, 2021

(86) PCT No.: PCT/US2021/016025
§ 371 (c)(1),
(2) Date: Aug. 2, 2022

(87) PCT Pub. No.: WO2021/158469
PCT Pub. Date: Aug. 12, 2021

(65) Prior Publication Data
US 2023/0071627 A1 Mar. 9, 2023

Related U.S. Application Data

(60) Provisional application No. 62/969,625, filed on Feb. 3, 2020.

(51) Int. Cl.
*B01D 65/10* (2006.01)

(52) U.S. Cl.
CPC ........ *B01D 65/102* (2013.01); *B01D 2273/18* (2013.01)

(58) Field of Classification Search
None
See application file for complete search history.

(56) References Cited

U.S. PATENT DOCUMENTS

| | | | |
|---|---|---|---|
| 6,319,494 | B1 | 11/2001 | Capon et al. |
| 6,660,843 | B1 | 12/2003 | Feige et al. |

(Continued)

FOREIGN PATENT DOCUMENTS

| | | | |
|---|---|---|---|
| EP | 1508362 A1 | 2/2005 | |
| WO | WO-99/54440 A1 | 10/1999 | |

(Continued)

OTHER PUBLICATIONS

Waterhouse et al., "The Validation of Sterilising Grade Microfiltration Membranes with Pseudomonas Diminuta, A Review", Journal of Membrane Science, vol. 104, No. 1, Aug. 15, 1995, 9 pages.

(Continued)

*Primary Examiner* — Michael Fuelling
(74) *Attorney, Agent, or Firm* — MARSHALL, GERSTEIN & BORUN LLP

(57) ABSTRACT

A method of reducing resource utilization for sterile filter validation includes obtaining historical datasets that each include respective values of a plurality of parameters associated with a respective sterile filtration process for a respective protein molecule, and generating, by processing the plurality of historical datasets, a PCA model. Vectors of the PCA model correspond to differently weighted combinations of the plurality of parameters, and collectively define a model space. The method also includes obtaining a target dataset that corresponds to a sterile filtration process for a target protein molecule, and includes target values of the plurality of parameters. The method also includes mapping the target values onto the model space, determining whether the mapped target values fall within a normal operating region of the model and error space, and causing sterile filter (Continued)

validation to be selectively bypassed or not bypassed accordingly.

18 Claims, 5 Drawing Sheets

(56) References Cited

U.S. PATENT DOCUMENTS

| | | | | |
|---|---|---|---|---|
| 7,138,370 | B2 | 11/2006 | Oliner et al. | |
| 7,511,012 | B2 | 3/2009 | Han et al. | |
| 7,640,148 | B2 * | 12/2009 | Tate, Jr. | B60W 40/12 703/2 |
| 7,741,465 | B1 | 6/2010 | Eshhar et al. | |
| 8,103,478 | B2 * | 1/2012 | Good | G06F 18/2135 702/182 |
| 8,301,406 | B2 * | 10/2012 | Lee | G06F 18/2137 702/77 |
| 11,098,079 | B2 * | 8/2021 | Hoang | C07K 16/2887 |
| 2006/0155541 | A1 * | 7/2006 | Tate, Jr. | B60W 40/12 704/256.3 |
| 2009/0276077 | A1 * | 11/2009 | Good | G06F 18/2135 703/2 |
| 2010/0023307 | A1 * | 1/2010 | Lee | G06F 18/2321 703/7 |
| 2014/0302037 | A1 | 10/2014 | Borges et al. | |
| 2014/0308285 | A1 | 10/2014 | Yan et al. | |
| 2021/0149361 | A1 * | 5/2021 | Jungbauer | G05B 19/0428 |
| 2023/0071627 | A1 * | 3/2023 | Kolvenbach | B01D 65/102 |
| 2024/0004355 | A1 * | 1/2024 | Zhao | G05B 13/048 |
| 2024/0310805 | A1 * | 9/2024 | Jungbauer | G01N 21/6486 |
| 2025/0053712 | A1 * | 2/2025 | Maiti | G01N 30/88 |

FOREIGN PATENT DOCUMENTS

| | | | |
|---|---|---|---|
| WO | WO-2005/040220 | A1 | 5/2005 |
| WO | WO-2008/119567 | A2 | 10/2008 |
| WO | WO-2013/128027 | A1 | 9/2013 |
| WO | WO-2014/140358 | A1 | 9/2014 |
| WO | WO-2014/151910 | A1 | 9/2014 |
| WO | WO-2015/048272 | A1 | 4/2015 |
| WO | WO-2017/134140 | A1 | 8/2017 |
| WO | WO-2017/174580 | A1 | 10/2017 |
| WO | WO-2019/191777 | A1 | 10/2019 |

OTHER PUBLICATIONS

McBurnie et al., "Validation of Sterile Filtration", Pharmaceutical Technology, 2004, 10 pages.

Guidance for Industry, "Process Validation: General Principles and Practices", Current Good Manufacturing Practices (CGMP), Revision 1, Jan. 2011, 22 pages.

Zelig Eshhar, "Tumor-specific T-bodies: Towards Clinical Application", Cancer Immunol Immunother, vol. 45, 1997, pp. 131-136.

Levy et al., "The Matrix Approach: Microbial Retention Testing of Sterilizing-Grade Filters With Final Parenteral Products, Part I", Pharmaceutical Technology, Sep. 1990, 160-173.

Levy et al., "The Matrix Approach: Microbial Retention Testing of Sterilizing-Grade Filters With Final Parenteral Products, Part II", Pharmaceutical Technology, May 1991, 7 pages.

International Search Report and Written Opinion in International Application No. PCT/US2021/016025 dated May 10, 2021, 14 pages.

* cited by examiner

400

420

MULTIVARIATE BRACKETING APPROACH FOR STERILE FILTER VALIDATION

FIELD OF THE DISCLOSURE

The present application relates generally to sterile filtration processes (e.g., for clinical production), and more specifically to techniques for determining whether to perform sterile filter validation.

BACKGROUND

Sterile filtration, using a thin membrane to remove particles or microorganisms, is generally required to preserve safety and efficacy of parenteral biologics. Sterile filter validation is a routine, regulatory requirement for parenteral biologics prior to product commercialization, in order to ensure performance of the filter and quality of the end product. There are four major elements in the sterile filter validation process: (1) physical/chemical compatibility testing; (2) extractable and leachable testing, along with processing conditions that will provide/identify nontoxic material originating from the filter; (3) integrity testing, which is a physical test that relates to microbial retention and is a determining factor of compatibility; and (4) bacterial challenge testing to measure capability of the filter for bacterial retention. Bacterial retention, or more generally microbial retention, performed by membrane filtration is achieved by two mechanisms: molecular sieving and adsorptive sequestration. The sieving mechanism operates through a combination of both surface screening and entrapment within the filter matrix, with sieving performance being independent of the number of organisms or the operating conditions so long as the pore size or the microorganism size is not adulterated. The adsorptive sequestration mechanism operates through an adsorptive process for microorganisms that are smaller than the filter pore size. Successful adsorption is dependent upon filter surface chemistry, the type and number of microorganisms, process conditions, and formulation conditions (e.g., surface tension, viscosity, etc.). While it has been hypothesized that molecular sieving is the predominant mechanism by which a sterile filtrate can be achieved, adsorptive sequestration can also play an important role.

The demonstration of microbial retention requires significant resources, and thus can be a roadblock for early stage clinical products where material and other resources are limited. For this reason, attempts have been made to predict the results of sterile filter validation studies, and thus (potentially) avoid the need to explicitly carry out the process validation. For example, one group of investigators has proposed a model identified as the "Matrix" approach. See Levy et al., Pharmaceutical Technology, 1990, 160-173; *The Matrix Approach: Microbial Retention Testing of Sterilizing-Grade Filters with Final Parenteral Products*, Part 1. In this model, formulation and process parameters are incorporated to define the molecular sieving mechanism. However, the Matrix approach does not incorporate or account for the adsorptive sequestration mechanism. Other techniques use a bracketing approach. See McBurnie et al., Pharmaceutical Technology, 2004, s13-s23; *Validation of Sterile Filtration*. However, these techniques fail to capture interdependencies among operating conditions, and therefore can suffer from low predictive accuracy.

BRIEF SUMMARY

To address the aforementioned limitations of current industrial practices for evaluating the need to perform product-specific sterile filter validation studies, a novel multivariate bracketing approach is described herein. The multivariate bracketing approach uses a multivariate statistical technique (principal component analysis, or "PCA") to build, from historical data, a model that captures information critical to the sterile filtration process. Unlike previous techniques, the model inherently accounts for both of the primary mechanisms associated with sterile filtration (i.e., molecular sieving and adsorptive sequestration), and the dependencies between those two mechanisms. Moreover, and also unlike previous techniques, the impact of intrinsic molecular parameters, which have a significant impact on sterile filtration, is modeled.

The success of the multivariate bracketing approach generally depends upon two major criteria: (1) the identification of product and process parameters critical to successful sterile filtration, and (2) thorough bracketing coverage of critical parameters using historical sterile filter validation data from commercial and/or clinical products. The PCA model may be built using process parameters, formulation parameters, and intrinsic molecular parameters obtained from commercial and/or pipeline products. The PCA model defines a multi-dimensional space, onto which data from a new (e.g., pipeline) product can be mapped. Depending on whether the new product maps onto a "normal" operating region within the model space (i.e., has a "signature" that is similar to past, successfully validated products), sterile filter validation may be bypassed. Thus, when applied to new molecules of interest, the multivariate bracketing approach described herein can aid in deciding whether sterile filter validation is needed in the early stages of development, and can potentially avoid the substantial depletion of resources (in terms of product/materials, time, manpower, cost, etc.) that typically accompanies sterile filter validation studies.

The technique described herein has several benefits, such as: (1) it incorporates all or most intrinsic molecular, formulation, and process parameters that impact sterile filtration, in order to account for their contributions and interactions with the filter membrane; (2) it is more robust than previous approaches; (3) it addresses both regulatory requirements and certain challenges that the industry faces during early stage drug product development; (4) it captures parameter interdependencies by using a multivariate analysis rather than multiple univariate assessments; and (5) it provides a clear decision as to the need for microbial retention studies associated with sterile filter validation. Regarding the third enumerated item above, recent FDA guidance on process validation states that:

> A successful validation program depends upon information and knowledge from product and process development. This knowledge and understanding is the basis for establishing an approach to control the manufacturing process that results in products with the desired quality attributes. Manufacturers should:
> Understand the sources of variation
> Detect the presence and degree of variation
> Understand the impact of variation on the process and ultimately on product attributes
> Control the variation in a manner commensurate with the risk it represents to the process and product Guidance for Industry, Process Validation: General Principles and Practices (FDA (2011), rev. 1, 1-19). The techniques described herein align with this guidance.

BRIEF DESCRIPTION OF THE DRAWINGS

The skilled artisan will understand that the figures, described herein, are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
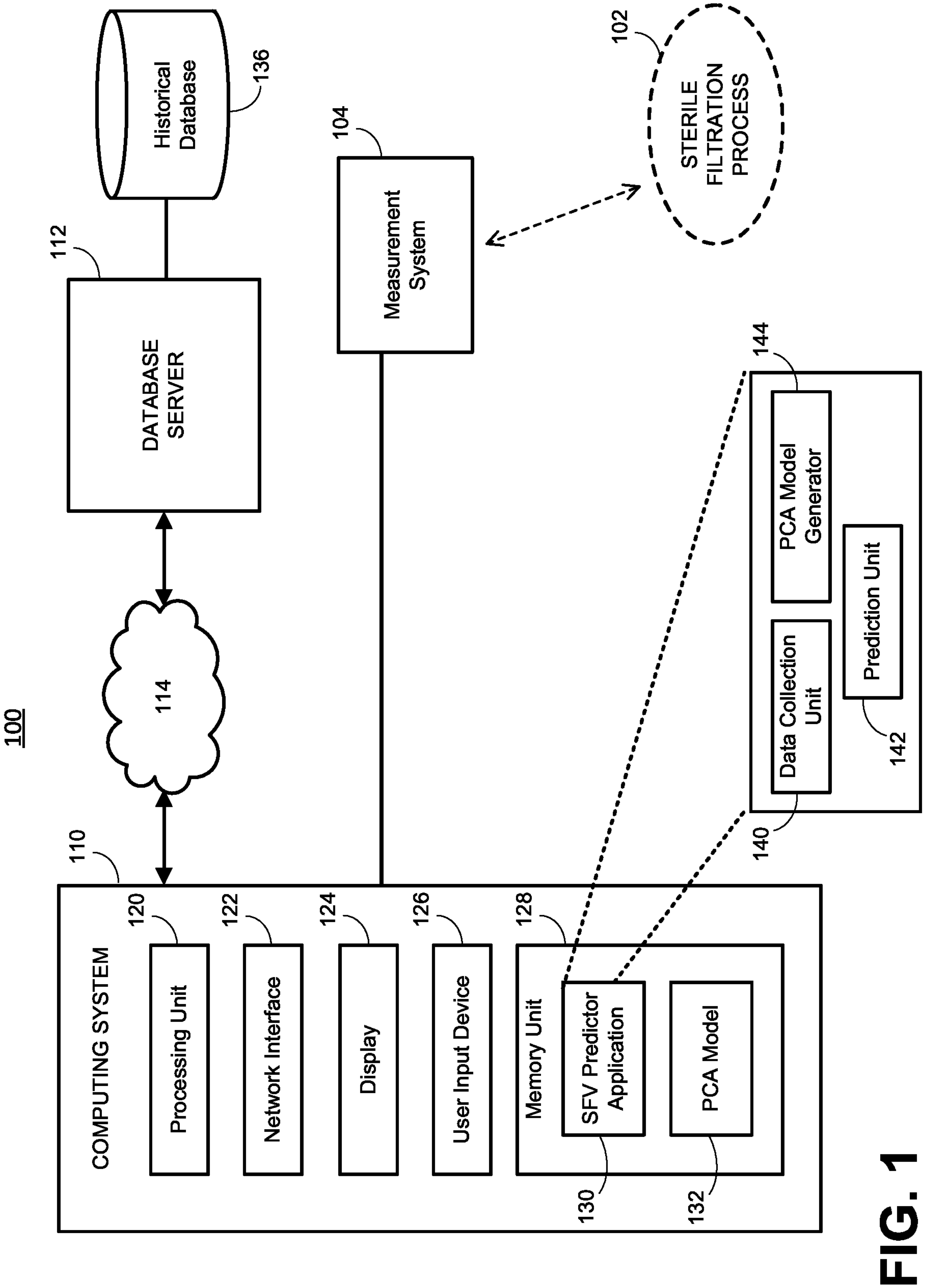
FIG. 1 is a simplified block diagram of an example system that may be used to predict sterile filter validation outcomes.

FIG. 1 is a simplified block diagram of an example system 100 that may be used to predict sterile filter validation (SFV) outcomes. In the system 100, a sterile filtration process 102 is designed, and possibly also implemented. In FIG. 1, the sterile filtration process 102 refers not only to the filtration process itself (e.g., with a specific filtration time, temperature, and other process parameters), but also to a specific protein molecule and a specific formulation. If not actually implemented, the sterile filtration process 102 is essentially a collection of characteristics/parameters that define a hypothetical sterile filtration process. If implemented, of course, the sterile filtration process 102 is associated with actual process, formulation and molecule characteristics/parameters.

In some embodiments, the system 100 includes a measurement system 104 that can be used to monitor one or more parameters associated with the sterile filtration process 102. For example, the measurement system 104 may include one or more instruments for directly sensing, and/or "soft" sensing, one or more operating characteristics of the sterile filtration process 102 (e.g., temperature, pressure, etc.), and/or characteristics of the formulation containing the protein molecule (e.g., pH, viscosity, conductivity/ionic strength, osmolarity or osmolality, etc.). In some embodiments and/or scenarios (e.g., if the sterile filtration process 102 is designed but not yet implemented), the system 100 does not include the measurement system 104.

The system 100 also includes a computing system 110, which may be coupled to a database server 112 via a network 114. The computing system 110 may be a single computing device (e.g., a desktop or laptop computer), or may include multiple computing devices that are communicatively coupled (e.g., via network 114) and reside in one or more physical locations. In the example embodiment shown in FIG. 1, the computing system 110 includes a processing unit 120, a network interface 122, a display 124, a user input device 126, and a memory unit 128. The processing unit 120 includes one or more processors, each of which may be a programmable microprocessor that executes software instructions stored in the memory unit 128 to execute some or all of the functions of the computing system 110 as described herein. The memory unit 128 may include one or more physical memory devices or units containing volatile and/or non-volatile memory. Any suitable memory type or types may be used, such as read-only memory (ROM), solid-state drives (SSDs), hard disk drives (HDDs), and so on.

The network interface 122 may include any suitable hardware (e.g., front-end transmitter and receiver hardware), firmware, and/or software configured to communicate via network 114 using one or more communication protocols. For example, the network interface 122 may be or include an Ethernet interface. The network 114 may be a single communication network, or may include multiple communication networks of one or more types (e.g., one or more wired and/or wireless local area networks (LANs), and/or one or more wired and/or wireless wide area networks (WANs) such as the Internet or an intranet, for example).

The display 124 may use any suitable display technology (e.g., LED, OLED, LCD, etc.) to visually present information to a user, and the user input device 126 may be a keyboard, microphone, or other suitable input device. A user may utilize the user input device 126 to design (e.g., enter numerical values for parameters of) the sterile filtration process 102, for example. In some embodiments, the display 124 and the user input device 126 are integrated within a single device (e.g., a touchscreen display). Generally, the display 124 and the user input device 126 may combine to enable a user to interact with graphical user interfaces (GUIs) provided by the computing system 110, e.g., for purposes discussed further below. In some embodiments, however, the computing system 110 does not include the display 124 and/or the user input device 126, or one or both of the display 124 and the user input device 126 are included in another computer or system that is communicatively coupled to the computing system 110.

The memory unit 128 stores the instructions of one or more software applications, including a sterile filter validation (SFV) predictor application 130. The SFV predictor application 130, when executed by the processing unit 120, is generally configured to predict sterile filter validation outcomes for designed (and possibly implemented) sterile filtration processes such as the process 102. A data collection unit 140 of the SFV predictor application 130 generally accepts or retrieves parameters of a sterile filtration process (e.g., process 102) as inputs. The parameters may be entered by a user via the user input device 126, or downloaded from a remote device (e.g., via network 114), for example. Additionally or alternatively, if the sterile filtration process 102 is physically implemented, some parameters (e.g., temperature, pressure, etc.) may be provided by the measurement system 104.

A prediction unit 142 of the SFV predictor application 130 operates on the collected parameters to output an indication of whether the corresponding sterile filtration process would, if subjected to validation studies, be successfully validated. To this end, the prediction unit 142 maps the parameter values of a sterile filtration process onto a model space defined by a principal component analysis (PCA) model 132, and determines whether the mapped values fall within a normal operation region defined by the model space ($T^2$) and an associated error space (SPE), as discussed further below.

In some embodiments, the SFV predictor application 130 also includes a PCA model generator 144 that builds the PCA model 132 prior to predicting outcomes for any sterile filtration processes. The PCA model generator 144 builds the PCA model 132 by accessing historical datasets stored in a database 136 of the database server 112. The data collection unit 140 may collect these historical datasets by requesting the data from database server 112, for example. In an alternative embodiment, the system 100 does not include the server 112, and the historical database 136 is local to the computing system 110. In another alternative embodiment, the PCA model generator 144 instead resides at the server 112, or in another computing device or system, in which case the computing system 110 obtains the PCA model 132 by a download or other means.

Each of the historical datasets in the database 136 includes parameters associated with a past sterile filtration process (e.g., sterile filtration process parameters, formulation parameters, and intrinsic protein molecule parameters), and possibly an indication of whether the dataset corresponds to a sterile filtration process (process/formulation/molecule) that was successfully validated (e.g., in accordance with applicable federal regulations). The principal component analysis generates multiple principal components, each of which is a vector that corresponds to a differently weighted combination of the parameters within the historical datasets. Collectively, these vectors form an uncorrelated, orthogonal basis set that defines a model space. The information captured by each principal component explains a unique aspect of the overall information contained in the historical dataset. In some embodiments, when building the PCA model 132, the PCA model generator 144 parameters have weights that depend on their respective contributions to the captured variance in the dataset, for example. Thus, when a new sterile filtration process is considered (e.g., process 102), the process is monitored at a much reduced dimension, as compared to a univariate way of monitoring based on the number of parameters contained in the historical datasets. Application of the principal component analysis (e.g., by the PCA model generator 144) is discussed in further detail below with reference to FIG. 2.

Intrinsic molecular parameters are those parameters specific to each individual molecule. Two intrinsic molecular parameters that can impact bacterial retention are hydrophobicity and isoelectric point. These two parameters may have an impact on adsorptive sequestration because the parameters relate to either charge state or hydrophobic properties of the molecule, and adsorption can be dependent on electrostatic and/or hydrophobic interactions. The isoelectric point ("pI") of a molecule is defined as the pH at which the net charge on the molecule would be neutral. If the formulation pH differs from the pI value of the molecule, the molecule will exhibit either a positive or negative charge. The pI value for each molecule is calculated from its amino acid composition. Depending on the filter composition, there may be a net positive, net negative or neutral charge on the surface of the filter. Polyvinylidene difluoride (PVDF) filter membranes have either neutral or a slightly negative charge on the surface. The presence and concentration of ions can change the net charge on the PVDF filter. Likewise, molecules possess an inherent charge. Therefore, the net charge a molecule presents to the filter membrane can in theory behave similarly to the ions (of a formulation) in solution. If the charge on the filter changes, other factors such as hydrophobic interactions may become more dominant and change the adsorptive behavior of the membrane.

The hydrophobic effect represents the tendency of water to exclude non-polar molecules. The effect originates from the disruption of highly dynamic hydrogen bonds between molecules of liquid water. If a molecule is strongly hydrophobic, it will have a tendency to exclude water. The specific hydrophobicity of a molecule can be determined either experimentally or through calculation. For large molecules such as antibodies, the number and size of hydrophobic regions can play a role in sterile filtration simply because these hydrophobic regions could interact with either the bacteria or the membrane.

"Formulation parameters" are those parameters associated with each individual molecule formulation. Six parameters that can impact bacterial retention (adsorptive sequestration and/or sieving) are pH, surface tension, viscosity, conductivity, osmolality, and density.

The pH of a formulation can render the formulation either bacteriostatic or even bactericidal depending on the lability of the organism used for validation testing. The organism typically chosen for validation studies is *B. diminuta*. One typical formulation pH for therapeutics is in the mildly acidic range of 5.2. However, the pH range for commercial and pipeline molecules can vary considerably. Successful retention of microorganisms is dependent upon an environment that is conducive to both growth and viability of the test organism. A microorganism that is exposed to an environment that is deleterious to its growth and viability can impact its size and therefore impact the sieving properties of the filter membrane.

Changes in surface tension may disrupt adsorptive interactions between the filter membrane surface and microorganisms that are smaller than 0.22 microns. Of the various formulation components, surfactants have a significant impact on surface tension. The inclusion of surfactants in a formulation significantly reduces surface tension. Therefore, the presence of surfactants may impact the adsorptive interactions such as hydrophobic-hydrophobic and/or electrostatic interactions between the membrane surfaces and any particles in the drug product solutions that are smaller than the filter pore size.

Viscosity describes the internal resistance of a fluid to flow, and may be thought of as a measure of fluid friction. In liquids, the additional forces between molecules become important. At a lower temperature, a fluid is more viscous and its velocity through filter pores at a given pressure decreases. As a result, the adsorptive interactions between microorganisms and filter membranes are more likely to occur. Both diffusion and particle-surface interactions have more time to occur, thereby impacting retention. Other factors that impact viscosity (and therefore retention) are protein type, protein concentration, and formulation excipients. Changes in viscosity may disrupt adsorptive interactions between microorganisms and filter membranes.

The conductivity of a solution is a measure of the electrical conductivity through ionic charge carriers, and by definition is proportional to the measure of the concentration of ions in that solution (ionic strength). As the concentration of ions in the solution increases, there is a decrease in the negative charge on a PVDF filter membrane. If the filter membrane becomes more neutral rather than charged, then hydrophobic forces may play a greater role, leading to increased adsorption of protein or bacteria. The conductivity of a solution can impact the viability, growth and size of bacteria as well as the pore size of the filter matrix.

The osmolality (or osmolarity) of a solution can impact both the performance of the filter and the efficiency of filtration under simulated processing conditions. Osmolality can also impact the growth of the microorganism, and thereby potentially impact the sieving mechanism relied upon for sterile filtration. An acceptable osmolality range of therapeutic products may be between about 240 and 340 mOsm/kg. This range is identified as "isotonic," whereas values below 240 mOsm/kg are "hypotonic" and values above 340 mOsm/kg are "hypertonic." A hypotonic solution is not usually considered harmful to microorganisms, as the rigid cell walls prevent bursting or plasmolysis. However, a hypertonic solution can cause crenation or plasmolysis of the cytoplasmic membrane within the cell. These conditions can impact the growth of the cell, and thereby potentially impact the sieving mechanism for sterile filtration.

The density of a protein solution is used in the calculation of filter load. Density is correlated with protein concentration and viscosity. The density of a solution can impact the adsorptive interactions between microorganisms and the filter membrane. Therefore, very high or very low solution densities may disrupt adsorptive interactions between microorganisms and filter membranes, as there are a finite number of adsorptive sites on the filter membrane.

Process parameters are generally those parameters associated with the manufacturing process. Five parameters that can impact bacterial retention (adsorptive sequestration or sieving) are temperature, filtration time, flow rate, differential pressure, and filter loading. FDA guidelines recommend validation under worst-case processing conditions in order to demonstrate that the filters are effective against bacterial retention. The worst-case conditions for pressure, filtration time and filter loading (i.e., the maximum value of these parameters) are therefore preferably used in the modeling described herein.

Another of the critical process parameters associated with sterile filtration is temperature, which affects microbial growth rates. It may be reasonable to hypothesize that bacteria such as *B. diminuta* would reproduce more effectively at 35° C. than at 20° C., for example. Colder temperatures (e.g., less than 20° C.) could slow microbial growth, which may impact the size of the bacteria and therefore impact the sieving mechanism. Temperature also impacts physical properties such as viscosity, density, surface tension and, to a lesser extent, pH. Changes in these parameters may impact both adsorptive sequestration and sieving mechanisms associated with sterile filtration.

The amount of time consumed for the sterile filtration process is dependent upon the amount of material, flow rate, and the filter capacity. Bacteria multiply at an exponential rate under optimal conditions. If the amount of time required to filter a batch of material is excessive, therefore, the bacterial population may increase and create an environment where filter failure can occur by penetration of the bacteria through the filter matrix. It has been demonstrated that, over extended periods of time, micro porous membrane filters will allow the movement of bacteria through the filter and into the effluent. For example, under laboratory conditions where the duration of filtration exceeds 48 hours, bacteria may appear in the filtrate of integral 0.22 μm rated filters. Therefore, the total amount of filtration time should be minimized.

Flow rate and time are inversely related. Therefore, flow rate should be optimized to minimize the time for sterile filtration, as exposure time can impact retention. An intermittent filter flow regime can be incorporated into the sterile filter validation exercise by simulating the intermittent flow, such as by using a timer and a pump that turns on and off at set intervals over the time of the validation study (to mimic pumping or filling cycles). Therefore, the intermittent flow rate condition may be modeled, in the techniques described herein, by other parameters, such as the filtration time, the filter loading, and the differential pressure.

Increased pressure during filtration increases the potential for filter failure. It was found that filtration through 0.45 micron mixed cellulose ester membranes were affected by pressure. Moreover, a 0.22 micron PVDF filter will retain *B. diminuta* when the maximum operating pressure meets or is less than the manufacturer's pressure recommendations, because filter manufacturers perform product integrity tests to establish filter pressure limits.

The filter loading for the sterile filtration application is defined by the amount of material to be filtered for a given surface area. A filter sizing study (using the so-called "Vmax" methodology) may be performed to allow proper filter size selection in the drug product manufacturing based on the batch size. Filters are generally selected to allow for successful filtration of maximum batch size without any risk of filter plugging/fouling. The total bacterial load of the filter is proportional to the filter loading for a given bacterial concentration in the product solution.

As seen from the foregoing discussion of various parameters, numerous redundancies and interdependencies exist in the sterile filtration process. The multivariate bracketing approach discussed herein, using principal component analysis, is particularly well-suited for identifying these redundancies (e.g., to ease monitoring requirements for new clinical products) and interdependencies (e.g., for better predictive accuracy).

Referring again now to FIG. 1, after the PCA model 132 is built using these and/or other appropriate parameters, the prediction unit 142 uses the PCA model 132 to generate output data indicating whether sterile filter validation would likely be successful for a particular sterile filtration process (e.g., process 102). The SFV predictor application 130 then generates an indication (e.g., text) based on that output data, and causes the display 124 to present the indication to a user via a graphical user interface (GUI). Additionally or alternatively, the indication may be presented via a GUI to a user of a remote device communicatively coupled to the computing system 110. The user viewing the indication, and/or other responsible individuals, may then determine whether sterile filter validation studies should be performed (or would likely be needed, etc.) for the sterile filtration process under consideration.

It is understood that other configurations and/or components may be used instead of those shown in FIG. 1. For example, one or more additional computing devices or systems may act as intermediaries between the computing system 110 and the database server 112, some or all of the functionality of the computing system 110 as described herein may instead be performed remotely by database server 112 and/or another remote server, and so on. As a more specific example, the entire SFV predictor application 130 may instead reside in the memory of a remote server (e.g., server 112), in which case a user of the computing system 110 may access the functionality of the SFV predictor application 130 via a web services platform.

Figure 2:
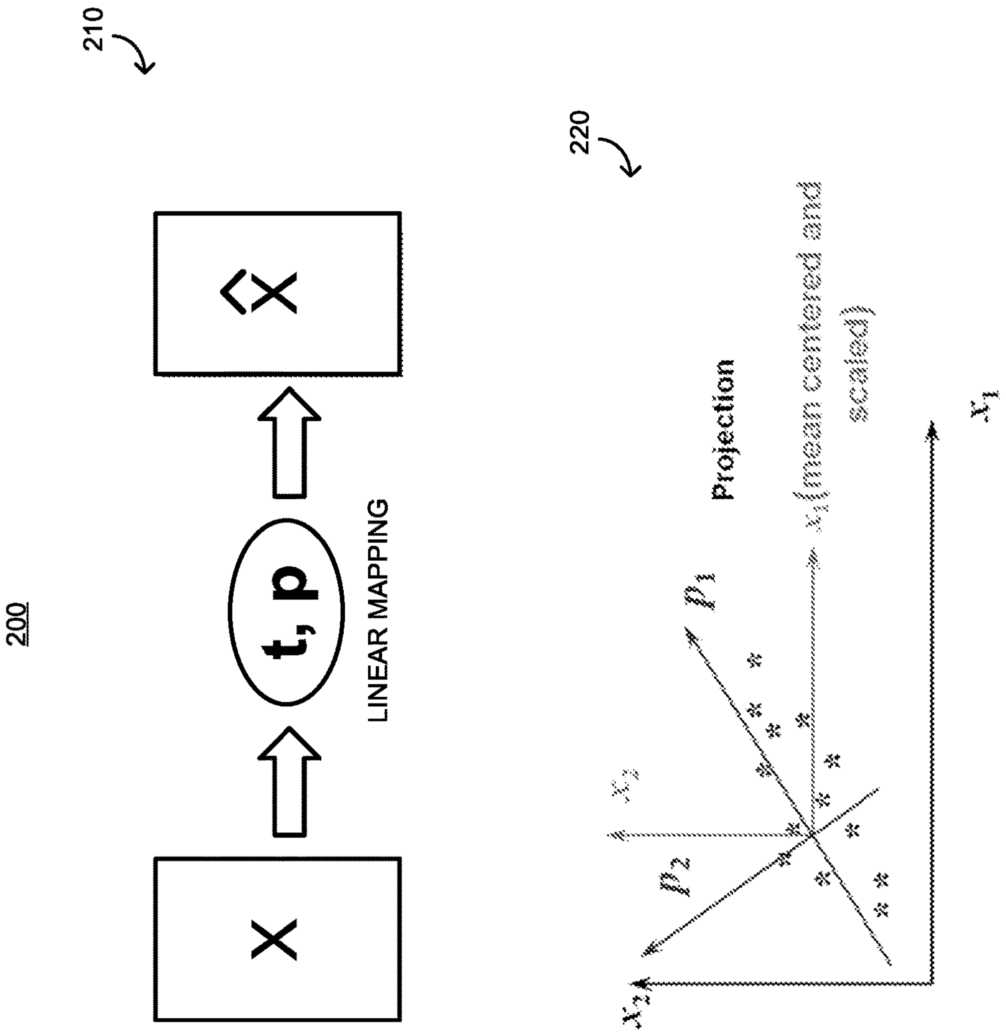
FIG. 2 depicts an example technique for modeling a sterile filtration process using principal component analysis.

FIG. 2 depicts an example technique 200 for modeling a sterile filtration process using principal component analysis, which may be implemented by the PCA model generator 144, for example. As seen in FIG. 2, the analysis involves a linear mapping 210 from a variable/parameter set x to a point $\hat{x}$ in a model space 220. While the model space 220 is shown (for clarity) as having only two parameters in the set x and only two principal components in the model space 220, it is understood that more parameters and principal components are possible. The modeling process will now be described in further detail.

When evaluating data sets that contain many variables, groups of variables can change collectively/interdependently. One reason for this is that more than one variable might be measuring the same driving principle governing the behavior of the overall system. Moreover, in processes such as sterile filtration, there can be multiple such driving forces (e.g., the molecular sieving and adsorptive sequestration mechanisms discussed above). Modern measurement systems technology generally enables the measurement of numerous system parameters/variables associated with sterile filtration processes, and redundancy in the information collected can be leveraged by modeling the correlation structure among measured variables.

Principal component analysis is a quantitatively rigorous multivariate method for achieving such a simplification. The method generates a new set of variables (e.g., $p_1$ and $p_2$ in model space 220 of FIG. 2), called principal components/scores. As noted above, each principal component is a linear combination of the original set of variables, and the principal components (vectors) collectively form an orthogonal basis for the space spanned by the data. Because all of the principal components are orthogonal to each other, there should be no redundant information captured by the model. The number of principal components generated is fewer than the number of original variables/parameters. A "first" principal component captures the highest variance of the variability contained in the modeling dataset, while the succeeding principal component captures the second largest variance subject to remaining uncorrelated with the preceding/first component, and so on for some number of different components.

Principal component analysis generally utilizes a modeling dataset and a test dataset. As noted above, a model is built (e.g., by the PCA model generator 144) using historical data that yielded a successful or desirable output from the process (here, successful sterile filter validation). The model is then used (e.g., by the prediction unit 142) to map incoming data (i.e., the test dataset, which may include parameters entered via user input device 126 and/or measured by measurement system 104, etc.) from subsequent operations or studies onto the model (vector) space. A "normal" operating region is defined within the model space, based on historical datasets for which the sterile filter was successfully validated, to achieve some desired confidence level in the predicted results (e.g., 95%, or 99%, etc.). An assessment can then be made (e.g., by the prediction unit 142) to determine similarity or dissimilarity of the new process (e.g., a new product applied to a new or previously used sterile filtration process) to historical experience with a defined confidence level. Results that yield "in-control" values are indicative of process and product characteristics similar to historical experience from which the normal operating region was created.

The normal operating region is built upon historical data (parameter values) known to have led to an acceptable product quality (successful sterile filter validation). Analysis of the scaled dataset (e.g., mean-centered and scaled to unit variance) using principal component analysis allows for the selection of principal components that capture the most important/relevant information in the data. Two measures of the principal component analysis are Hotelling's $T^2$ (also referred to herein as simply "$T^2$"), and squared prediction error (SPE), which provide complementary information about the status of the process, and are used to define the boundary of the normal operating region. Stated differently, the normal operating region is defined with respect to both the model space and its associated error space.

Based on the selected number of principal components, the majority of the variability captured by the model (e.g., PCA model 132) can be summarized using the $T^2$ measure:

$$T^2 = \sum_{k=1}^{K} \frac{t_k^2}{\lambda_k}$$

where $$t_k^2$$

is the square of scores captured by the $k^{th}$ principal component (k=1, 2, . . . , K), and $\lambda_k$ is the variance of $t_k$.

The SPE measure calculates the distance to the model as follows:

$$SPE = \sum_{i=1}^{m} \sum_{j=1}^{p} (x_{ij} - \hat{x}_{ij})^2$$

where $x_{ij}$ is the scaled $i^{th}$ observation of the $j^{th}$ original variable (i=1, 2, . . . , m; j=1, 2, . . . , p), and $\hat{x}_{ij}$ denotes the corresponding variable predicted by the principal component analysis model using K principal components.

As noted above, the normal operating region may be expressed as a decision boundary for $T^2$ and SPE values. Upper 95% control limits for both measures are calculated as follows:

$$UCL_{T^2} = \frac{k(m-1)}{m-k} F_{k,m,\alpha}$$

$$UCL_{SPE} = \theta_1 \left[ 1 + \frac{c_\alpha \sqrt{2\theta_2 h_0^2}}{\theta_1} + \frac{\theta_2 h_0 (h_0 - 1)}{\theta_1^2} \right]^{\frac{1}{h_0}}$$

$$\theta_1 = \sum_{i=K+1}^{p} \lambda_i$$

$$\theta_2 = \sum_{i=k+1}^{p} \lambda_i^2$$

with where $c_\alpha$ is the standard normal deviate that cuts off an area of $\alpha$ under the upper tail of the t-distribution if $h_0$ is positive, and under the lower tail of the t-distribution if $h_0$ is negative.

In the multivariate bracketing approach implemented by the system 100, the PCA model generator 144 may use principal component analysis to create a "fingerprint" (score) for each of a number of commercial and/or clinical therapeutic products. This "fingerprint" may be a unique combination of intrinsic molecular properties, formulation and process parameters. In some implementations, the PCA model generator 144 uses the scores, which may be expressed as a set of a few latent variables associated with principal components, to build the PCA model 132 and to define the normal operating region. Using these techniques, the mechanism by which the process, formulation and/or molecule parameters affect the sterile filtration process need not be well-understood.

When new process dataset is mapped onto the model space and compared to the normal operating region, an inference can be made for decision making. If values of $T^2$ and SPE (corresponding to new products/batches/etc.) remain within acceptable bounds, the inference is that there is no difference (or no substantial difference) in the operating characteristics defined by the parameters considered important/relevant to the sterile filtration process, relative to the operating characteristics of sterile filtration processes for which validation was successful. In other words, the $T^2$ and SPE values are within the historical range defined by the multivariate space at a particular (e.g., 95%) coverage level. Thus, the SFV predictor application 130 may predict/indicate that no explicit filter validation is needed. A 95% level of coverage roughly corresponds to a set of two times sigma control limits, and presents a conservative estimate of the normal operating region. Conversely, if values of $T^2$ and SPE instead fall outside of acceptable bounds, the inference is that there exists a significant change in the operating characteristics defined by the parameters considered important/relevant to the sterile filtration process, in which case a filter validation study (or possibly a redesign/modification of sterile filtration process parameters, etc.) is needed.

Figure 3:
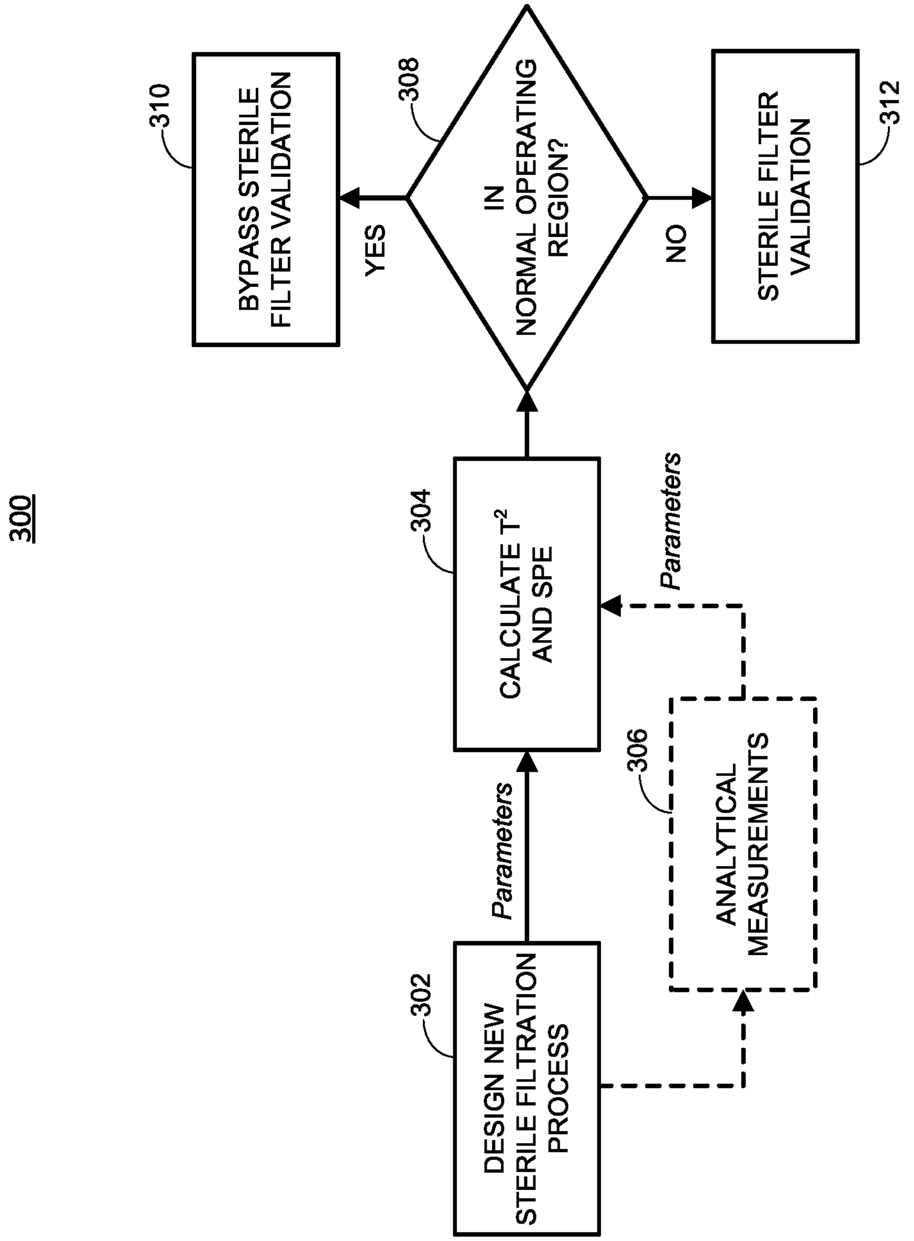
FIG. 3 depicts an example process for selectively bypassing sterile filter validation, which can be implemented using the example system of FIG. 1.

FIG. 3 depicts an example process 300 for selectively bypassing (or not bypassing) sterile filter validation, which may be implemented using the system 100 of FIG. 1. The process 300 assumes that a PCA model (e.g., PCA model 132) has already been built. At a first stage 302 of the process 300, a new sterile filtration process (e.g., the sterile filtration process 102) is designed. "Design" of a sterile filtration process at stage 302 may include, for example, identification, selection and/or development of a protein molecule corresponding to a potential drug product (for which sterile filtration is needed), a type of formulation (and/or specific formulation characteristics) for that drug product, and operating conditions/characteristics of the sterile process itself. Alternatively, the design at stage 302 may include the selection of specific molecule, formulation and/or process parameters for a hypothetical sterile filtration process, without necessarily identifying or selecting any real-world molecule or formulation.

Values of parameters associated with the protein molecule, formulation and process are operated upon (e.g., by the prediction unit 142) to calculate a $T^2$ and SPE, at a stage 304. If the sterile filtration process is actually implemented, in some embodiments, one or more parameters are monitored/measured at a stage 306 (e.g., by the measurement system 104), and are also passed to stage 304 for calculation of the $T^2$ and SPE. As one example, stage 304 may calculate the $T^2$ and SPE values based on a filtration time of the process, and a known type, hydrophobicity and isoelectric point of the protein molecule, that stage 304 receives directly from stage 302 (e.g., based on user inputs), and also based on temperature, pressure, pH and/or other parameter values that are measured at stage 306. In other embodiments (e.g., if the sterile filtration process is only hypothetical), stage 306 is omitted.

Figure 4A:
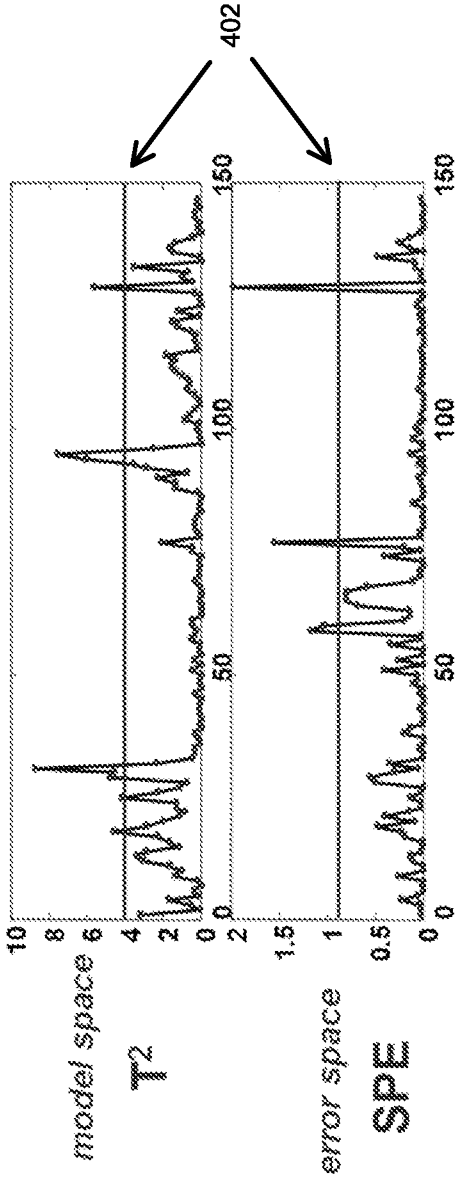
FIGS. 4A and 4B depict an example normal operating region, and associated Hotelling $T^2$ and SPE values, for a model space generated using principal component analysis.

At a stage 308, it is determined (e.g., by the prediction unit 142) whether the calculated $T^2$ and SPE correspond to the various parameter values being within (i.e., being mapped to) the normal operating region. Stage 308 may include comparing the $T^2$ and SPE values to respective threshold values, and determining that the parameters do not map to the normal operating region if either the $T^2$ or the SPE value exceeds its respective threshold. FIG. 4A depicts a plot 400 with example thresholds 402 for both $T^2$ and SPE, across 150 different datasets of molecule/formulation/process parameters. As seen in the plot 400, roughly 10 different processes/datasets were found to exceed at least one of the two thresholds 402, in this example, and therefore fall outside the normal operating region and require sterile filter validation.

Figure 4B:
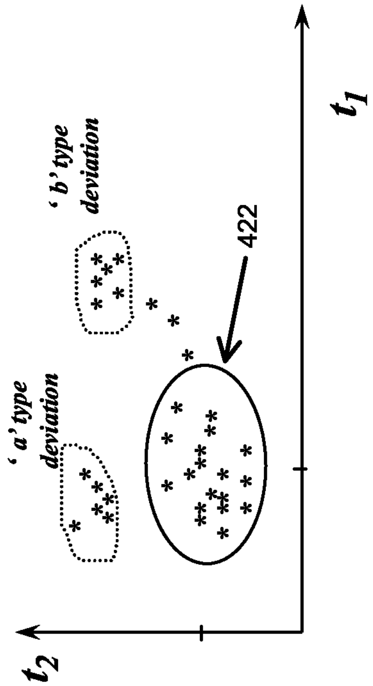

FIG. 4B depicts another example plot 420, which shows a relatively simple (two-dimensional) normal operating region 422. If a particular dataset exceeds a $T^2$ threshold, the corresponding point in the plot 420 will fall outside the normal operating region 422. As seen in the plot 420, there may be some clustering of datasets that fall outside of the normal operating region 422 (here, shown as "a" and "b" type deviations). Such clustering may be indicative of a particular type of change in operating conditions, for example, and may indicate that studies are needed to identify the reason or mechanism underlying each of the clustered deviations.

Returning to FIG. 3, if the dataset/parameter values corresponding to the process designed at stage 302 map to an area of the model space that is inside the normal operating region, then sterile filter validation may be bypassed (stage 310). For example, stage 310 may include presenting an indicator of acceptability to one or more users (e.g., via a GUI on display 124), who may then take steps (or avoid taking steps) to bypass sterile filter validation, or to bypass a particular type of sterile filter validation (e.g., for microbial retention). Conversely, if the dataset/parameter values do not map to the normal operating range, then sterile filter validation is not bypassed (stage 312). Stage 312 may include presenting an indicator of unacceptability to one or more users (e.g., via a GUI on display 124). Stage 312 may include actually performing sterile filter validation, actually performing a particular type of sterile filter validation (e.g., for microbial retention), or determining that a new sterile filtration process must be designed (e.g., as at stage 302), for example.

Figure 5:
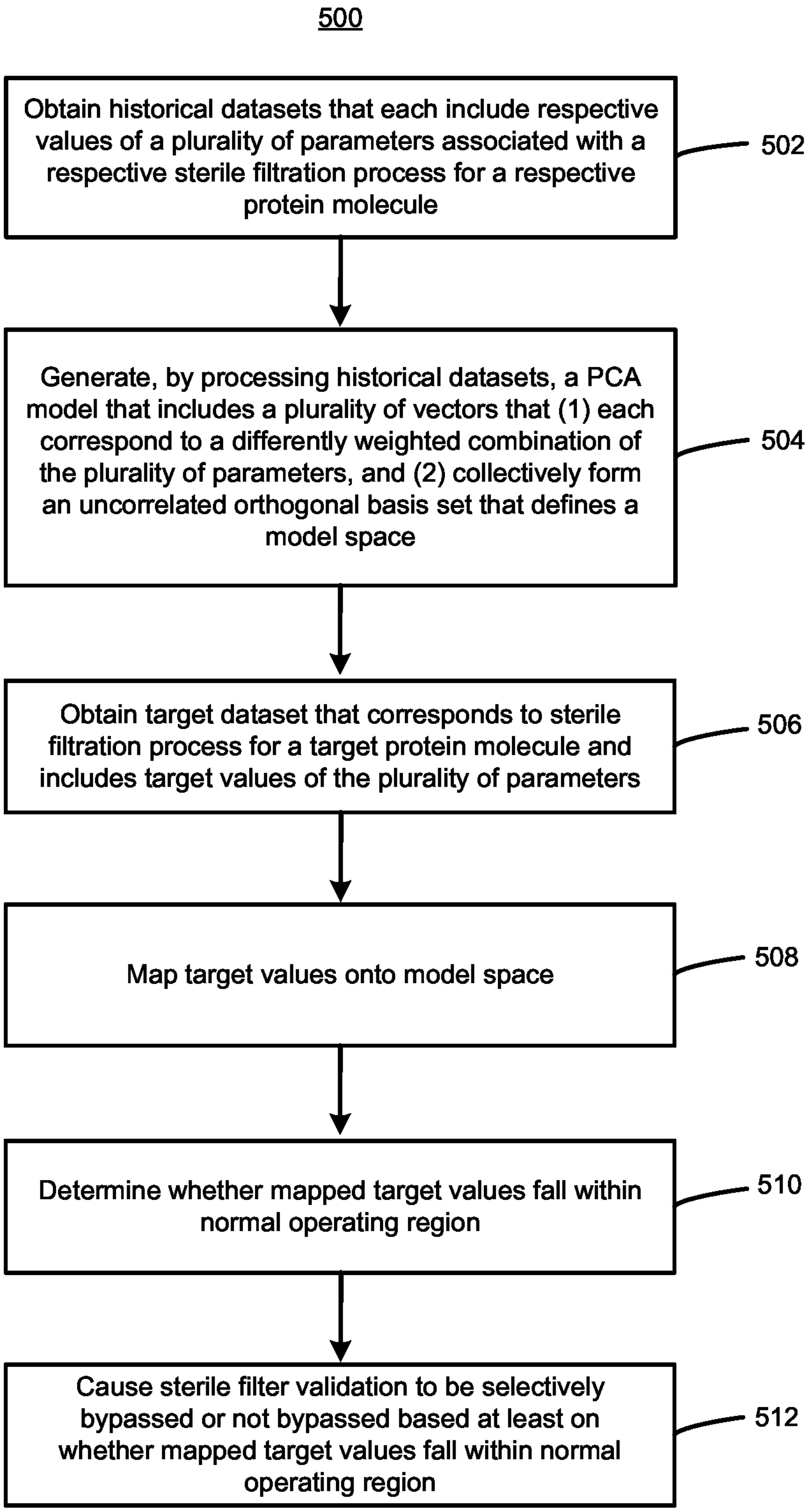
FIG. 5 is a flow diagram of an example method of reducing resource utilization for sterile filter validation.

FIG. 5 is a flow diagram of an example method 500 of reducing resource utilization for sterile filter validation. The method 500 may be implemented by the computing system 110 of FIG. 1 (e.g., by processing unit 120 executing instructions of SFV predictor application 130), for example.

At block 502, historical datasets are obtained. Each historical dataset includes respective values of a plurality of parameters associated with a respective sterile filtration process for a respective protein molecule. The plurality of parameters includes one or more process parameters (e.g., filtration time, temperature, pressure, and/or filter loading), one or more formulation parameters (e.g., pH, viscosity, conductivity or ionic strength, surface tension, and/or osmolality or osmolarity), and/or one or more intrinsic protein molecule parameters (e.g., molecule type, hydrophobicity, and/or isoelectric point).

At block 504, the historical datasets are processed to generate a PCA model (e.g., PCA model 132). The PCA model includes vectors that each correspond to a differently weighted, linear combination of the plurality of parameters, with the vectors collectively forming an uncorrelated orthogonal basis set that defines a model space. In some embodiments, vectors that correspond to relatively unimportant principal components (e.g., with low variance) are ignored, or excluded entirely from the PCA model.

At block 506, a target dataset that corresponds to a sterile filtration process for a target protein molecule is obtained. The target dataset includes target values of the plurality of parameters. In some scenarios, the historical datasets correspond to past commercial processes (some or all of which were associated with successful sterile filter validation studies), while the target dataset corresponds to a current or planned clinical process. Block 506 may include performing one or more measurements on the sterile filtration process for the target protein molecule (e.g., using measurement system 104), and/or receiving parameter values entered by a user (e.g., via user input device 126) and/or obtained by other means (e.g., by accessing a local file, downloading a file, receiving values from a remote client device that is using a web services predictive model, etc.).

At block 508, the target values are mapped onto the model space. The mapping at block 508 may include using the target values to calculate values corresponding to each orthogonal basis vector (principal component) of the model space. As a simplified example, if a first principal component/vector is defined as:

$$P1=0.5(\text{norm temperature})+0.2(\text{norm viscosity})+0.2(\text{norm surface tension})+0.1(\text{norm } pH),$$

then block 508 may include normalizing temperature, viscosity, surface tension and pH parameter values from the target dataset, and weighting those normalized values in the same manner in order to determine the P1 component of the mapping.

At block 510, it is determined whether the mapped target values fall within a normal operating region of the model space. Block 510 may include calculating a $T^2$ value of the target dataset based on the mapped target values, and comparing the calculated $T^2$ value to a threshold $T^2$ value, for example. Additionally, in some embodiments, block 510 includes calculating an SPE of the target dataset based on the mapped target values, and comparing the calculated SPE to a threshold SPE. The mapped values may be determined to fall within the normal operating region if, and only if, both the $T^2$ value and the SPE value fall below their respective threshold values, for example.

At block 512, sterile filter validation is caused to be selectively bypassed, or not bypassed, based at least on whether the mapped target values fall within the normal operating region (as determined at block 510). In some embodiments, for example, block 512 triggers the bypassing of the sterile filter validation, or triggers performance of sterile filter validation (or possibly, revisiting the design/parameters of the target process, etc.) by generating an indication of whether sterile filter validation is needed or recommended based on whether the mapped target values fall within the normal operating region, and presenting the indication to a user via a GUI (e.g., on the display 124). It is understood that "bypassing" or "not bypassing" sterile filter validation may refer to bypassing or not bypassing only a particular type of sterile filter validation (e.g., related to microbial retention). Block 512 may include stages 308 and 310, or stages 308 and 312, of the example process 300, for example.

In some embodiments, the method 500 includes one or more additional blocks not shown in FIG. 5. For example, the method 500 may include a first additional block, after block 512, in which sterile filter validation is performed. Moreover, the method 500 may include additional blocks in which, after sterile filter validation is performed, the target dataset is added to the historical datasets, and the normal operating region is updated using the additional data provided by the target dataset.

Additional considerations pertaining to this disclosure will now be addressed.

The terms "polypeptide" or "protein" are used interchangeably throughout and refer to a molecule comprising two or more amino acid residues joined to each other by peptide bonds. Polypeptides and proteins also include macromolecules having one or more deletions from, insertions to, and/or substitutions of the amino acid residues of the native sequence, that is, a polypeptide or protein produced by a naturally-occurring and non-recombinant cell; or is produced by a genetically-engineered or recombinant cell, and comprise molecules having one or more deletions from, insertions to, and/or substitutions of the amino acid residues of the amino acid sequence of the native protein. Polypeptides and proteins also include amino acid polymers in which one or more amino acids are chemical analogs of a corresponding naturally-occurring amino acid and polymers. Polypeptides and proteins are also inclusive of modifications including, but not limited to, glycosylation, lipid attachment, sulfation, gamma-carboxylation of glutamic acid residues, hydroxylation and ADP-ribosylation.

Polypeptides and proteins can be of scientific or commercial interest, including protein-based therapeutics. Proteins include, among other things, secreted proteins, non-secreted proteins, intracellular proteins or membrane-bound proteins. Polypeptides and proteins can be produced by recombinant animal cell lines using cell culture methods and may be referred to as "recombinant proteins". The expressed protein(s) may be produced intracellularly or secreted into the culture medium from which it can be recovered and/or collected. Proteins include proteins that exert a therapeutic effect by binding a target, particularly a target among those listed below, including targets derived therefrom, targets related thereto, and modifications thereof.

Proteins "antigen-binding proteins". Antigen-binding protein refers to proteins or polypeptides that comprise an antigen-binding region or antigen-binding portion that has a strong affinity for another molecule to which it binds (antigen). Antigen-binding proteins encompass antibodies, peptibodies, antibody fragments, antibody derivatives, antibody analogs, fusion proteins (including single-chain variable fragments (scFvs) and double-chain (divalent) scFvs, muteins, xMAbs, and chimeric antigen receptors (CARs).

An scFv is a single chain antibody fragment having the variable regions of the heavy and light chains of an antibody linked together. See U.S. Pat. Nos. 7,741,465, and 6,319,494 as well as Eshhar et al., Cancer Immunol Immunotherapy (1997) 45: 131-136. An scFv retains the parent antibody's ability to specifically interact with target antigen.

The term "antibody" includes reference to both glycosylated and non-glycosylated immunoglobulins of any isotype or subclass or to an antigen-binding region thereof that competes with the intact antibody for specific binding. Unless otherwise specified, antibodies include human, humanized, chimeric, multi-specific, monoclonal, polyclonal, heteroIgG, XmAbs, bispecific, and oligomers or antigen binding fragments thereof. Antibodies include the IgG1-, IgG2- IgG3- or IgG4-type. Also included are proteins having an antigen binding fragment or region such as Fab, Fab', F(ab')2, Fv, diabodies, Fd, dAb, maxibodies, single chain antibody molecules, single domain VHH, complementarity determining region (CDR) fragments, scFv, diabodies, triabodies, tetrabodies and polypeptides that contain at least a portion of an immunoglobulin that is sufficient to confer specific antigen binding to a target polypeptide.

Also included are human, humanized, and other antigen-binding proteins, such as human and humanized antibodies, that do not engender significantly deleterious immune responses when administered to a human.

Also included are peptibodies, polypeptides comprising one or more bioactive peptides joined together, optionally via linkers, with an Fc domain. See U.S. Pat. Nos. 6,660, 843, 7,138,370 and 7,511,012.

Proteins also include genetically engineered receptors such as chimeric antigen receptors (CARs or CAR-Ts) and T cell receptors (TCRs). CARs typically incorporate an antigen binding domain (such as scFv) in tandem with one or more costimulatory ("signaling") domains and one or more activating domains.

Also included are bispecific T cell engagers (BiTE®) antibody constructs are recombinant protein constructs made from two flexibly linked antibody derived binding domains (see WO 99/54440 and WO 2005/040220). One binding domain of the construct is specific for a selected tumor-associated surface antigen on target cells; the second binding domain is specific for CD3, a subunit of the T cell receptor complex on T cells. The BiTE® constructs may also include the ability to bind to a context independent epitope at the N-terminus of the CD3s chain (WO 2008/119567) to more specifically activate T cells. Half-life extended BiTE® constructs include fusion of the small bispecific antibody construct to larger proteins, which preferably do not interfere with the therapeutic effect of the BiTE® antibody construct. Examples for such further developments of bispecific T cell engagers comprise bispecific Fc-molecules e.g. described in US 2014/0302037, US 2014/0308285, WO 2014/151910 and WO 2015/048272. An alternative strategy is the use of human serum albumin (HAS) fused to the bispecific molecule or the mere fusion of human albumin binding peptides (see e.g. WO 2013/128027, WO2014/140358). Another HLE BiTE® strategy comprises fusing a first domain binding to a target cell surface antigen, a second domain binding to an extracellular epitope of the human and/or the Macaca CD3e chain and a third domain, which is the specific Fc modality (WO 2017/134140).

Also included are modified proteins, such as are proteins modified chemically by a non-covalent bond, covalent bond, or both a covalent and non-covalent bond. Also included are proteins further comprising one or more post-translational modifications which may be made by cellular modification systems or modifications introduced ex vivo by enzymatic and/or chemical methods or introduced in other ways.

Proteins may also include recombinant fusion proteins comprising, for example, a multimerization domain, such as a leucine zipper, a coiled coil, an Fc portion of an immunoglobulin, and the like. Also included are proteins comprising all or part of the amino acid sequences of differentiation antigens (referred to as CD proteins) or their ligands or proteins substantially similar to either of these.

In some embodiments, proteins may include colony stimulating factors, such as granulocyte colony-stimulating factor (G-CSF). Such G-CSF agents include, but are not limited to, Neupogen® (filgrastim) and Neulasta® (pegfilgrastim). Also included are erythropoiesis stimulating agents (ESA), such as Epogen® (epoetin alfa), Aranesp® (darbepoetin alfa), Dynepo® (epoetin delta), Mircera® (methyoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin zeta, epoetin theta, and epoetin delta, epoetin omega, epoetin iota, tissue plasminogen activator, GLP-1 receptor agonists, as well as the molecules or variants or analogs thereof and biosimilars of any of the foregoing.

In some embodiments, proteins may include proteins that bind specifically to one or more CD proteins, HER receptor family proteins, cell adhesion molecules, growth factors, nerve growth factors, fibroblast growth factors, transforming growth factors (TGF), insulin-like growth factors, osteoinductive factors, insulin and insulin-related proteins, coagulation and coagulation-related proteins, colony stimulating factors (CSFs), other blood and serum proteins blood group antigens; receptors, receptor-associated proteins, growth hormones, growth hormone receptors, T-cell receptors; neurotrophic factors, neurotrophins, relaxins, interferons, interleukins, viral antigens, lipoproteins, integrins, rheumatoid factors, immunotoxins, surface membrane proteins, transport proteins, homing receptors, addressins, regulatory proteins, and immunoadhesins.

In some embodiments proteins may include proteins that bind to one of more of the following, alone or in any combination: CD proteins including but not limited to CD3, CD4, CD5, CD7, CD8, CD19, CD20, CD22, CD25, CD30, CD33, CD34, CD38, CD40, CD70, CD123, CD133, CD138, CD171, and CD174, HER receptor family proteins, including, for instance, HER2, HER3, HER4, and the EGF receptor, EGFRvIII, cell adhesion molecules, for example, LFA-1, Mol, p150,95, VLA-4, ICAM-1, VCAM, and alpha v/beta 3 integrin, growth factors, including but not limited to, for example, vascular endothelial growth factor ("VEGF"); VEGFR2, growth hormone, thyroid stimulating hormone, follicle stimulating hormone, luteinizing hormone, growth hormone releasing factor, parathyroid hormone, mullerian-inhibiting substance, human macrophage inflammatory protein (MIP-1-alpha), erythropoietin (EPO), nerve growth factor, such as NGF-beta, platelet-derived growth factor (PDGF), fibroblast growth factors, including, for instance, aFGF and bFGF, epidermal growth factor (EGF), Cripto, transforming growth factors (TGF), including, among others, TGF-α and TGF-μ, including TGF-β1, TGF-β2, TGF-β3, TGF-β4, or TGF-β5, insulin-like growth factors-I and -II (IGF-I and IGF-II), des(1-3)-IGF-I (brain IGF-I), and osteoinductive factors, insulins and insulin-related proteins, including but not limited to insulin, insulin A-chain, insulin B-chain, proinsulin, and insulin-like growth factor binding proteins; (coagulation and coagulation-related proteins, such as, among others, factor VIII, tissue factor, von Willebrand factor, protein C, alpha-1-antitrypsin, plasminogen activators, such as urokinase and tissue plasminogen activator ("t-PA"), bombazine, thrombin, thrombopoietin, and thrombopoietin receptor, colony stimulating factors (CSFs), including the following, among others, M-CSF, GM-CSF, and G-CSF, other blood and serum proteins, including but not limited to albumin, IgE, and blood group antigens, receptors and receptor-associated proteins, including, for example, flk2/flt3 receptor, obesity (OB) receptor, growth hormone receptors, and T-cell receptors; (x) neurotrophic factors, including but not limited to, bone-derived neurotrophic factor (BDNF) and neurotrophin-3, -4, -5, or -6 (NT-3, NT-4, NT-5, or NT-6); (xi) relaxin A-chain, relaxin B-chain, and prorelaxin, interferons, including for example, interferon-alpha, -beta, and -gamma, interleukins (ILs), e.g., IL-1 to IL-10, IL-12, IL-15, IL-17, IL-23, IL-12/IL-23, IL-2Ra, IL1-R1, IL-6 receptor, IL-4 receptor and/or IL-13 to the receptor, IL-13RA2, or IL-17 receptor, IL-1RAP; (xiv) viral antigens, including but not limited to, an AIDS envelope viral antigen, lipoproteins, calcitonin, glucagon, atrial natriuretic factor, lung surfactant, tumor necrosis factor-alpha and -beta, enkephalinase, BCMA, IgKappa, ROR-1, ERBB2, mesothelin, RANTES (regulated on activation normally T-cell expressed and secreted), mouse gonadotropin-associated peptide, Dnase, FR-alpha, inhibin, and activin, integrin, protein A or D, rheumatoid factors, immunotoxins, bone morphogenetic protein (BMP), superoxide dismutase, surface membrane proteins, decay accelerating factor (DAF), AIDS envelope, transport proteins, homing receptors, MIC (MIC-a, MIC-B), ULBP 1-6, EPCAM, addressins, regulatory proteins, immunoadhesins, antigen-binding proteins, somatropin, CTGF, CTLA4, eotaxin-1, MUC1, CEA, c-MET, Claudin-18, GPC-3, EPHA2, FPA, LMP1, MG7, NY-ESO-1, PSCA, ganglioside GD2, glanglioside GM2, BAFF, OPGL (RANKL), myostatin, Dickkopf-1 (DKK-1), Ang2, NGF, IGF-1 receptor, hepatocyte growth factor (HGF), TRAIL-R2, c-Kit, B7RP-1, PSMA, NKG2D-1, programmed cell death protein 1 and ligand, PD1 and PDL1, mannose receptor/hCGβ, hepatitis-C virus, mesothelin dsFv[PE38 conjugate, *Legionella pneumophila* (lly), IFN gamma, interferon gamma induced protein 10 (IP10), IFNAR, TALL-1, thymic stromal lymphopoietin (TSLP), proprotein convertase subtilisin/Kexin Type 9 (PCSK9), stem cell factors, Flt-3, calcitonin gene-related peptide (CGRP), OX40L, α4β7, platelet specific (platelet glycoprotein Iib/IIIb (PAC-1), transforming growth factor beta (TFGβ), Zona pellucida sperm-binding protein 3 (ZP-3), TWEAK, platelet derived growth factor receptor alpha (PDGFRα), sclerostin, and biologically active fragments or variants of any of the foregoing.

In another embodiment, proteins include abciximab, adalimumab, adecatumumab, aflibercept, alemtuzumab, alirocumab, anakinra, atacicept, basiliximab, belimumab, bevacizumab, biosozumab, blinatumomab, brentuximab vedotin, brodalumab, cantuzumab mertansine, canakinumab, cetuximab, certolizumab pegol, conatumumab, daclizumab, denosumab, eculizumab, edrecolomab, efalizumab, epratuzumab, etanercept, evolocumab, galiximab, ganitumab, gemtuzumab, golimumab, ibritumomab tiuxetan, infliximab, ipilimumab, lerdelimumab, lumiliximab, lxdkizumab, mapatumumab, motesanib diphosphate, muromonab-CD3, natalizumab, nesiritide, nimotuzumab, nivolumab, ocrelizumab, ofatumumab, omalizumab, oprelvekin, palivizumab, panitumumab, pembrolizumab, pertuzumab, pexelizumab, ranibizumab, rilotumumab, rituximab, romiplostim, romosozumab, sargamostim, tocilizumab, tositumomab, trastuzumab, ustekinumab, vedolizumab, visilizumab, volociximab, zanolimumab, zalutumumab, and biosimilars of any of the foregoing.

Proteins encompass all of the foregoing and further include antibodies comprising 1, 2, 3, 4, 5, or 6 of the complementarity determining regions (CDRs) of any of the aforementioned antibodies. Also included are variants that comprise a region that is 70% or more, especially 80% or more, more especially 90% or more, yet more especially 95% or more, particularly 97% or more, more particularly 98% or more, yet more particularly 99% or more identical in amino acid sequence to a reference amino acid sequence of a protein of interest. Identity in this regard can be determined using a variety of well-known and readily available amino acid sequence analysis software. Preferred software includes those that implement the Smith-Waterman algorithms, considered a satisfactory solution to the problem of searching and aligning sequences. Other algorithms also may be employed, particularly where speed is an important consideration. Commonly employed programs for alignment and homology matching of DNAs, RNAs, and polypeptides that can be used in this regard include FASTA, TFASTA, BLASTN, BLASTP, BLASTX, TBLASTN, PROSRCH, BLAZE, and MPSRCH, the latter being an implementation of the Smith-Waterman algorithm for execution on massively parallel processors made by MasPar.

Some of the figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components.

Embodiments of the disclosure relate to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices ("PLDs"), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

As used herein, the singular terms "a," "an," and "the" may include plural referents, unless the context clearly dictates otherwise.

As used herein, the terms "connect," "connected," and "connection" refer to an operational coupling or linking. Connected components can be directly or indirectly coupled to one another, for example, through another set of components.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to 1%, less than or equal to ±0.5%, less than or equal to 0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to 1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes, tolerances and/or other reasons. There may be other embodiments of the present disclosure which are not specifically illustrated. The specification (other than the claims) and drawings are to be regarded as illustrative rather than restrictive. Modifications may be made to adapt a particular situation, material, composition of matter, technique, or process to the objective, spirit and scope of the present disclosure. All such modifications are intended to be within the scope of the claims appended hereto. While the techniques disclosed herein have been described with reference to particular operations performed in a particular order, it will be understood that these operations may be combined, sub-divided, or re-ordered to form an equivalent technique without departing from the teachings of the present disclosure. Accordingly, unless specifically indicated herein, the order and grouping of the operations are not limitations of the present disclosure.

What is claimed:

1. A method of reducing resource utilization for sterile filter validation, the method comprising:

obtaining, by one or more processors, a plurality of historical datasets that each include respective values of a plurality of parameters associated with a respective sterile filtration process for a respective protein molecule, wherein the plurality of parameters includes one or more process parameters, one or more formulation parameters, and/or one or more intrinsic protein molecule parameters;

generating, by one or more processors processing the plurality of historical datasets, a principal component analysis (PCA) model that includes a plurality of vectors, the vectors (i) each corresponding to a differently weighted combination of the plurality of parameters and (ii) collectively forming an uncorrelated orthogonal basis set that defines a model space;

obtaining, by one or more processors, a target dataset that corresponds to a sterile filtration process for a target protein molecule and includes target values of the plurality of parameters;

mapping, by one or more processors, the target values onto the model space using the PCA model;

determining, by one or more processors, whether the mapped target values fall within a normal operating region of the model space and an associated error space, including:

calculating, based on the mapped target values, a squared prediction error (SPE) of the target dataset and a $T^2$ value of the target dataset, comparing:

the calculated SPE to a threshold SPE and the calculated $T^2$ value to a threshold $T^2$ value; and in response to both (1) the calculated SPE not exceeding the threshold SPE and (2) the calculated $T^2$ value not exceeding the threshold $T^2$ value, determining that the mapped target values fall within the normal operating region; or in response to at least one of (3) the calculated SPE exceeding the threshold SPE or (4) the calculated $T^2$ value exceeding the threshold $T^2$ value, determining that the mapped target values fall outside of the normal operating region; and performing one of:

in response to a determination that the mapped target values fall within the normal operating region, causing, by one or more processors, sterile filter validation to be bypassed; or in response to a determination that the mapped target values fall outside of the normal operating region, causing, by one or more processors, sterile filter validation to not be bypassed.

2. The method of claim 1, wherein the plurality of parameters includes the one or more process parameters.

3. The method of claim 2, wherein the one or more process parameters include:

filtration time;

temperature;

pressure; and/or filter loading.

4. The method of claim 1, wherein the plurality of parameters includes the one or more formulation parameters.

5. The method of claim 4, wherein the one or more formulation parameters include:

pH;

viscosity;

conductivity or ionic strength;

surface tension; and/or osmolarity or osmolality.

6. The method of claim 1, wherein the plurality of parameters includes the one or more intrinsic protein molecule parameters.

7. The method of claim 6, wherein the one or more intrinsic protein molecule parameters include:

molecule type;

hydrophobicity; and/or isoelectric point.

8. The method of claim 1, further comprising:

generating, based on whether the mapped target values fall within the normal operating region, an indication of whether sterile filter validation is recommended; and presenting, on a display, the indication of whether sterile filter validation is recommended.

9. The method of claim 1, wherein obtaining the target dataset includes performing, using one or more instruments of a measurement system, one or more measurements on the sterile filtration process for the target protein molecule.

10. A computing system comprising:

one or more processors; and one or more memories storing instructions that, when executed by the one or more processors, cause the computing system to obtain a plurality of historical datasets that each include respective values of a plurality of parameters associated with a respective sterile filtration process for a respective protein molecule, wherein the plurality of parameters includes one or more process parameters, one or more formulation parameters, and/or one or more intrinsic protein molecule parameters, generate, by processing the plurality of historical datasets, a principal component analysis (PCA) model that includes a plurality of vectors, the vectors (i) each corresponding to a differently weighted combination of the plurality of parameters and (ii) collectively forming an uncorrelated orthogonal basis set that defines a model space, obtain a target dataset that corresponds to a sterile filtration process for a target protein molecule and includes target values of the plurality of parameters, map the target values onto the model space using the PCA model, determine whether the mapped target values fall within a normal operating region of the model space and an associated error space, including:

calculate, based on the mapped target values, a squared prediction error (SPE) of the target dataset and a $T^2$ value of the target dataset, compare:

the calculated SPE to a threshold SPE and the calculated $T^2$ value to a threshold $T^2$ value; and in response to both (1) the calculated SPE not exceeding the threshold SPE and (2) the calculated $T^2$ value not exceeding the threshold $T^2$ value, determine that the mapped target values fall within the normal operating region; or in response to at least one of (3) the calculated SPE exceeding the threshold SPE or (4) the calculated $T^2$ value exceeding the threshold $T^2$ value, determine that the mapped target values fall outside of the normal operating region, and perform one of:

in response to a determination that the mapped target values fall within the normal operating region, cause sterile filter validation to be bypassed, or in response to a determination that the mapped target values fall outside of the normal operating region, cause sterile filter validation to not be bypassed.

11. The computing system of claim 10, wherein the plurality of parameters includes the one or more process parameters.

12. The computing system of claim 11, wherein the one or more process parameters include:

filtration time;

temperature;

pressure; and/or filter loading.

13. The computing system of claim 10, wherein the plurality of parameters includes the one or more formulation parameters.

14. The computing system of claim 13, wherein the one or more formulation parameters include:

pH;

viscosity;

conductivity or ionic strength;

surface tension; and/or osmolarity or osmolality.

15. The computing system of claim 10, wherein the plurality of parameters includes the one or more intrinsic protein molecule parameters.

16. The computing system of claim 15, wherein the one or more intrinsic protein molecule parameters include:

molecule type;

hydrophobicity; and/or isoelectric point.

17. The computing system of claim 10, further comprising a display, and the instructions cause the computing system to further:

generating, based on whether the mapped target values fall within the normal operating region, an indication of whether sterile filter validation is recommended; and presenting, on the display, the indication of whether sterile filter validation is recommended.

18. The computing system of claim 10, further comprising a measurement system, and wherein obtaining the target dataset includes performing, using the measurement system, one or more measurements on the sterile filtration process for the target protein molecule.

* * * * *